United States Patent
Meguriya et al.

(10) Patent No.: US 6,333,364 B2
(45) Date of Patent: Dec. 25, 2001

(54) SILICONE RUBBER COMPOSITIONS

(75) Inventors: Noriyuki Meguriya; Nobumasa Tomizawa, both of Gunma-ken (JP)

(73) Assignee: Shin Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/778,878

(22) Filed: Feb. 8, 2001

(30) Foreign Application Priority Data

Feb. 8, 2000 (JP) .................................................. 12-030347

(51) Int. Cl.$^7$ ........................................................ C08J 9/32
(52) U.S. Cl. ............................ 521/54; 521/88; 521/134; 521/154
(58) Field of Search ........................... 521/54, 154, 88, 521/134

(56) References Cited

U.S. PATENT DOCUMENTS

| | | | |
|---|---|---|---|
| 3,238,157 | * 3/1966 | Smith et al. ........................... | 521/154 |
| 4,492,775 | * 1/1985 | Koshii et al. .......................... | 521/154 |
| 4,719,249 | * 1/1988 | Dietlein et al. ........................ | 521/54 |
| 5,216,037 | * 6/1993 | Miyoshi et al. ....................... | 521/154 |
| 5,246,973 | 9/1993 | Nakamura . | |
| 5,750,581 | 5/1998 | Brennenstuhl . | |
| 5,981,610 | * 11/1999 | Meguriya et al. ...................... | 521/55 |

FOREIGN PATENT DOCUMENTS

| | | |
|---|---|---|
| A5209080 | 8/1993 | (JP) . |
| A9137063 | 5/1997 | (JP) . |
| A1060151 | 3/1998 | (JP) . |

\* cited by examiner

*Primary Examiner*—Morton Foelak

(57) ABSTRACT

A silicone rubber composition comprising (A) 100 parts by weight of a heat curable organopolysiloxane composition, (B) 0.1–30 parts by weight of unexpanded or expanded organic resin-base microspheres, and (C) 0.5–50 parts by weight of a polyhydric alcohol or derivative thereof cures into a low specific gravity silicone rubber elastomer which experiences a minimal compression set at elevated temperature.

12 Claims, No Drawings

SILICONE RUBBER COMPOSITIONS

This invention relates to silicone rubber compositions having blended therein an organic resin fine hollow filler or an organic resin fine filler adapted to expand into a hollow filler upon heating.

BACKGROUND OF THE INVENTION

Heat curing type liquid silicone rubber compositions are employed in a variety of applications since they are effectively moldable and exhibit good heat resistance, weather resistance and electrical insulation after molding. On the other hand, silicone rubber sponge is lightweight while maintaining the heat resistance, weather resistance, electrical insulation inherent to silicone rubber. By virtue of the inclusion of gas in the molded part, the silicone rubber sponge serves the function of a shock absorber or cushioning member by utilizing its volume contraction and the function of a thermal insulating or thermal storage material by utilizing its low heat transfer, finding a wide variety of applications. One version of the silicone rubber sponge is a silicone rubber foam which is prepared by several methods, for example, by adding a thermally decomposable blowing agent, or by molding and curing while generating hydrogen gas by-product. In the method of adding a thermally decomposable blowing agent, the toxicity and odor of decomposed gases are problems. In the system wherein a platinum catalyst is used as the curing catalyst, the retardation of cure by the blowing agent is a problem. The method of utilizing hydrogen gas by-produced during the curing step suffers from such problems as the potential explosion of hydrogen gas and the careful handling of uncured composition during shelf storage. Further, the gas generating method encounters difficulty in forming controlled uniform cells when the silicone rubber composition is a liquid one. One known approach addressing the above-mentioned problems is to incorporate hollow particles of inorganic material, typically ceramic material into rubber. This method provides little contribution to weight reduction because of a high specific gravity and achieves only a little thermal conductivity decline and a weak cushioning effect because of the inorganic nature. It is also known from JP-A 5-209080 corresponding to U.S. Pat. No. 5,246,973 and JP-A 9-137063 corresponding to U.S. Pat. No. 5,750,581 to add a hollow filler of organic resin and an organic resin filler encapsulating a volatile material so that it may expand upon heating. Since the heat resistance of the organic resin filler is poor, the physical properties of molded parts are largely altered, failing to take advantage of the heat resistance of silicone rubber. In particular, the compression set increases to considerably large values at elevated temperature, especially above 80° C. due to the influence of hollow filler. This negates the application to sealants, gaskets, cushions and rolls which are used at elevated temperature.

SUMMARY OF THE INVENTION

An object of the invention is to provide a silicone rubber composition capable of forming a low specific gravity rubbery elastomer having a minimal compression set even at elevated temperature.

The invention is directed to a silicone rubber composition comprising a heat curable organopolysiloxane composition and a thermally expandable, unexpanded organic resin fine filler or expanded organic resin fine hollow filler. It has been found that when a polyhydric alcohol or derivative thereof is blended in this silicone rubber composition, the polyhydric alcohol or derivative thereof effectively functions as an improver capable of improving the compression set of a hollow filler-loaded, low specific gravity silicon rubber elastomer even at elevated temperature. There is obtained a hollow filler-loaded, low specific gravity silicon rubber elastomer which undergoes a reduced compression set at elevated temperature, and thus finds effective application as sealants, gaskets, cushions and rolls which are used at elevated temperature.

Accordingly, the invention provides a silicone rubber composition comprising
(A) 100 parts by weight of a heat curable organopolysiloxane composition,
(B) 0.1 to 30 parts by weight of a thermally expandable, unexpanded organic resin fine filler or expanded organic resin fine hollow filler, and
(C) 0.5 to 50 parts by weight of at least one of polyhydric alcohols and derivatives thereof.

DESCRIPTION OF THE PREFERRED EMBODIMENT

Component (A) is a heat curable organopolysiloxane composition which may be either an addition reaction curing type organopolysiloxane composition or an organic peroxide curing type organopolysiloxane composition.

The addition reaction curing type organopolysiloxane composition is preferably defined as comprising (1) 100 parts by weight of an organopolysiloxane having on the average at least two alkenyl groups in a molecule, (2) 0.1 to 50 parts by weight of an organohydrogenpolysiloxane having on the average at least two hydrogen atoms attached to silicon atoms in a molecule, and (3) a catalytic amount of an addition reaction catalyst.

The organic peroxide curing type organopolysiloxane composition is preferably defined as comprising (i) 100 parts by weight of an organopolysiloxane having on the average at least two alkenyl groups in a molecule, and (ii) a catalytic amount of an organic peroxide.

In the addition reaction curing type organopolysiloxane composition, the organopolysiloxane having on the average at least two alkenyl groups in a molecule as component (1) is typically represented by the following average compositional formula (1):

$$R^1_a SiO_{(4-a)/2} \tag{1}$$

wherein $R^1$, which may be the same or different, is a substituted or unsubstituted monovalent hydrocarbon group of 1 to 10 carbon atoms, preferably 1 to 8 carbon atoms, and "a" is a positive number of 1.5 to 2.8, preferably 1.8 to 2.5, and more preferably 1.95 to 2.05.

Examples of the substituted or unsubstituted monovalent hydrocarbon groups attached to silicon atoms, represented by $R^1$, include alkyl groups such as methyl, ethyl, propyl, isopropyl, butyl, isobutyl, tert-butyl, pentyl, neopentyl, hexyl, cyclohexyl, octyl, nonyl and adecyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted ones of the foregoing groups in which some or all of the hydrogen atoms are replaced by halogen atoms (e.g., fluoro, bromo and chloro), cyano groups or the like, such as chloromethyl, chloropropyl, bromoethyl, trifluoropropyl and cyanoethyl.

At least two of the $R^1$ groups must be alkenyl groups, preferably of 2 to 8 carbon atoms, more preferably 2 to 6 carbon atoms. It is noted that the content of alkenyl groups is preferably 0.001 to 20 mol %, especially 0.01 to 10 mol % based on the entire organic groups attached to silicon atoms (that is, the substituted or unsubstituted monovalent hydrocarbon groups included as $R^1$ in formula (1)). The alkenyl groups may be attached to silicon atoms at ends of the molecular chain and/or silicon atoms midway the molecular chain. When the cure rate of the composition and the physical properties of cured parts are taken into account, the organopolysiloxane should preferably have at least alkenyl groups attached to the silicon atoms at molecular chain ends.

With respect to the structure, the organopolysiloxane is generally a diorganopolysiloxane of a basically straight chain structure whose backbone is comprised of recurring diorganosiloxane units and which is blocked with a triorganosiloxy group at either end of the molecular chain. However, it may have a partially branched or cyclic structure. The alkenyl group-containing organopolysiloxane may have any desired degree of polymerization or viscosity, and encompasses from ones having a low degree of polymerization which are liquid at room temperature (25° C.) to gum-like ones having a high degree of polymerization. Often, the organopolysiloxane used herein has an average degree of polymerization (weight average degree of polymerization) of about 50 to 20,000, preferably about 100 to 10,000, and more preferably about 100 to 2,000. With an average degree of polymerization of less than 50, the cured rubber sometimes has unsatisfactory physical properties.

As component (2), the organohydrogenpolysiloxane is typically represented by the following average compositional formula (2):

and should have at least two (generally 2 to about 300), preferably at least three, and more preferably 3 to about 150, silicon atom-attached hydrogen atoms (SiH groups).

In formula (2), $R^2$ is a substituted or unsubstituted monovalent hydrocarbon group of 1 to 10 carbon atoms, examples of which are as described for $R^1$ in formula (1). The letter b is a positive number of 0.7 to 2.1, c is a positive number of 0.001 to 1.0, and b+c is 0.8 to 3.0. Preferably, b is 1.0 to 2.0, c is 0.01 to 1.0, and b+c is 1.5 to 2.5.

At least two, preferably at least three SiH groups in the molecule may be positioned at ends and/or midway of the molecular chain. The molecular structure of organohydrogen-polysiloxane may be straight, cyclic, branched or three-dimensional network. Desirable are those which are liquid at room temperature (25° C.) and have a number of silicon atoms per molecule or a degree of polymerization in the range of about 2 to about 300, more desirably about 4 to about 150.

Exemplary organohydrogenpolysiloxanes of formula (2) include 1,1,3,3-tetramethyldisiloxane, methylhydrogencyclo-polysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked methylhydrogensiloxane-dimethylsiloxane-diphenylsiloxane copolymers, copolymers of $(CH_3)_2HSiO_{1/2}$ units, $(CH_3)_3SiO_{1/2}$ units, and $SiO_{4/2}$ units, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)_3SiO_{1/2}$ units.

The organohydrogenpolysiloxane (2) is blended in an amount of 0.1 to 50 parts, preferably 0.3 to 20 parts by weight per 100 parts by weight of the organopolysiloxane (1). Differently stated, the organohydrogenpolysiloxane (2) is blended in such an amount that about 0.5 to 5 mol, preferably about 0.8 to 2.5 mol of silicon atom-attached hydrogen atoms (SiH groups) in component (2) are available per mol of silicon atom-attached alkenyl groups in component (1).

Component (3) is an addition reaction catalyst. Platinum group metal catalysts are typical, including platinum catalysts, for example, platinum black, platinic chloride, chloroplatinic acid, reaction products of chloroplatinic acid with monohydric alcohols, complexes of chloroplatinic acid with olefins, and platinum bisacetoacetate, palladium catalysts, and rhodium catalysts. The addition reaction catalyst (3) is used in a catalytic amount, typically about 0.5 to 1,000 parts, preferably about 1 to 500 parts by weight of platinum group metal per million parts by weight of components (1) and (2) combined.

The addition reaction curing type organopolysiloxane composition is comprised of components (1), (2) and (3) as mentioned above.

Reference is now made to the organic peroxide curing type organopolysiloxane composition. The organopolysiloxane having on the average at least two alkenyl groups in a molecule used herein as component (i) may be the same as component (1) defined above.

The organic peroxide (ii) used herein may be selected from conventional well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, 1,1-bis(t-butylperoxy)-3,3,5-trimethylcyclohexane, and 1,6-bis(t-butylperoxy-carboxy) hexane.

The organic peroxide is used in a catalytic amount, usually 0.01 to 10 parts by weight per 100 parts by weight of the organopolysiloxane (i).

The organic peroxide curing type organopolysiloxane composition is comprised of components (i) and (ii) as mentioned above.

According to the invention, a thermally expandable, unexpanded organic resin fine filler or expanded organic resin fine hollow filler (B) is blended in the heat curable organopolysiloxane composition (A). The filler serves to create gas-filled cells within a cured rubber to lower its specific gravity like sponge rubber.

Preferably the organic resin of the filler is a polymer of a monomer or a copolymer of at least two monomers selected from among vinylidene chloride, acrylonitrile, methacrylonitrile, acrylates, and mechacrylates. In one preferred embodiment, the unexpanded organic resin fine filler comprises an organic resin shell encapsulating a volatile material or low-boiling material. Either the blending of the unexpanded filler so that the unexpanded filler may be expanded into a hollow filler at the same time as heat curing or the blending of previously expanded hollow filler is contemplated herein. In the latter embodiment wherein the hollow filler is blended, an inorganic filler may be applied to the surface of the hollow filler prior to blending for the purpose of increasing the strength of the hollow filler.

In order that the hollow filler in the expanded state possess the function of reducing the specific gravity and heat conductivity of the silicone rubber composition, the filler should preferably have a true specific gravity of 0.01 to 0.5, more preferably 0.01 to 0.3. A filler with a true specific gravity of less than 0.01 may be awkward to handle and blend, and result in a hollow filler having an insufficient strength to withstand pressure so that the hollow filler collapses during molding, failing to achieve weight reduction. If the hollow filler has a true specific gravity of more than 0.5, the specific gravity of the silicone rubber is not fully reduced. The hollow filler as expanded should preferably have a mean particle size of 10 to 200 μm, more preferably 10 to 150 μm. A hollow filler larger than 200 μm can be destroyed by the pressure during molding, resulting in a higher specific gravity and a loss of durability. The mean particle size can be determined as a weight average value (or median diameter) by means of a particle size distribution meter using laser light diffractometry and similar analysis means.

The amount of the filler blended is 0.1 to 30 parts, preferably 0.2 to 20 parts by weight per 100 parts by weight of the organopolysiloxane composition and is such that the filler accounts for 10 to 80% by volume. With less than 10% by volume, there may be achieved less reductions of specific gravity and heat conductivity. With more than 80% by volume, molding and blending may become difficult, and the molded part become a brittle one lacking rubbery elasticity.

According to the invention, one or more polyhydric alcohol or derivative thereof is blended as component (C). This serves as a compression set improver.

The polyhydric alcohol used herein is a monomer having at least two alcoholic hydroxyl groups (i.e., hydroxyl groups bonded to aliphatic carbon atoms) in a molecule or an oligomer or polymer thereof. Examples include glycerin, ethylene glycol, propylene glycol, pentaerythritol, glycerin-α-monochlorohydrin, as well as oligomers and polymers thereof, such as diethylene glycol, triethylene glycol, dipropylene glycol, polyethylene glycol, polypropylene glycol, and polyglycerin. Those oligomers and polymers having a degree of polymerization of about 2 to 10, especially about 2 to 5 are preferred for the purpose of reducing compression set. Derivatives of the polyhydric alcohols include monomers having at least one residual alcoholic hydroxyl group in a molecule and oligomers and polymers thereof, for example, partially etherified compounds such as ethylene glycol monoethyl ether, ethylene glycol monophenyl ether, diethylene glycol monomethyl ether and dipropylene glycol monoethyl ether, partially esterified compounds such as glycerin monoacetate, glycerin diacetate and ethylene glycol monoacetate, and partially silylated compounds. The preferred oligomers and polymers of such derivatives should also have a degree of polymerization of about 2 to 10, especially about 2 to 5, for the same reason.

The amount of the polyhydric alcohol or derivative (C) blended is 0.5 to 50 parts, preferably 1 to 40 parts by weight per 100 parts by weight of the organopolysiloxane composition. Less amounts of the polyhydric alcohol are ineffective for imparting low compression set property. Excessive amounts of the polyhydric alcohol can affect rubber material, for example, reducing the hardness and strength (tensile strength and tear strength) of rubber and degrading the cure behavior.

In one preferred embodiment, a thixotropic agent is blended in the silicone rubber composition. The thixotropic agent may be any of compounds capable of suppressing the flow of a material and imparting thixotropy thereto. In general, the thixotropic agents in solid state include fumed silica, fumed titanium oxide, and carbon. They may be used as such or after surface treatment with organosilicon compounds, for example, hexamethylsilazane, trimethylchlorosilane and polymethylsiloxane. As to liquid thixotropic agents (which are liquid at room temperature or 25° C.), any of thixotropic compounds which are incompatible with the inventive composition may be used. Typical examples are polyether compounds having an average degree of polymerization of at least 20 such as polyethylene oxide, polypropylene oxide, polyethylene glycol, and polypropylene glycol, block polymers thereof with siloxane compounds, and copolymers of dimethylsiloxane and diphenylsiloxane.

The thixotropic agents may be used alone or in admixture of two or more. The thixotropic agent is blended in an amount of 0.01 to 30 parts, preferably 0.03 to 20 parts by weight per 100 parts by weight of the organopolysiloxane (A). Less than 0.01 part of the thixotropic agent would fail to impart thixotropy whereas more than 30 parts of the thixotropic agent would adversely affect moldability and rubber physical properties.

In addition to the essential components mentioned above, another filler may be blended for the purpose of improving the mechanical strength, heat resistance or flame retardance of molded parts, as long as the benefits of the invention are not impaired. Such additional fillers including reinforcing fillers such as precipitated silica and fired silica and non-reinforcing fillers such as ground quartz, diatomaceous earth, asbestos, aluminosilicate, iron oxide, zinc oxide, calcium carbonate, magnesium carbonate, and cerium oxide. They may be used as such or after surface treatment with organosilicon compounds such as hexamethylsilazane, trimethylchlorosilane and polymethylsiloxane.

If desired, various additives such as flame retardants, fire resistance modifiers, sensitizers, colorants, heat resistance modifiers, and reducing agents, reaction regulators (e.g., ethynyl cyclohexanol), parting agents, and filler-dispersing agents may be added to the silicone rubber composition in addition to the essential components mentioned above. Exemplary filler-dispersing agents include alkoxysilanes, carbon functional silanes, and silanol group-containing low molecular weight siloxanes and are preferably added in a minimal amount so as not to compromise the effect of the invention.

The silicone rubber composition of the invention may be prepared by uniformly mixing the above essential and optional components in a rubber milling machine such as a twin-roll mill, Banbury mixer, dough mixer or kneader, optionally followed by heat treatment. It is acceptable to premix part or all of the organopolysiloxane (1) with an inorganic filler such as silica and optionally a surface treating agent to form a base compound and thereafter, mix the base compound with the remainder of the organopolysiloxane (1), organohydrogenpolysiloxane (2), addition reaction catalyst (3), hollow filler, polyhydric alcohol, and other optional components.

The silicone rubber composition thus obtained can be molded into suitable silicone rubber parts by various molding processes such as injection molding, casting, compression molding and extrusion molding processes, preferably by injection molding. Curing conditions may be selected from a wide range. For example, appropriate curing conditions for compression molding in a mold include 120 to 220° C. and about 5 minutes to 1 hour. Appropriate curing conditions for injection molding include 80 to 220° C. and about 10 seconds to 10 minutes.

EXAMPLE

Examples of the invention are given below by way of illustration and not by way of limitation. All parts are by weight.

Example 1

In a mixer, 68 parts of a dimethylpolysiloxane (1) blocked with a dimethylvinylsiloxy group at each end of its molecular chain and having a viscosity of 10,000 centipoise at 25° C., 32 parts of fumed silica having a specific surface area of 200 m²/g (Aerosil 200 by Nippon Aerosil K.K.), 5 parts of hexamethyldisilazane, 0.5 part of divinyltetramethyldisilazane, and 2.0 parts of water were mixed for 30 minutes at room temperature, heated at 150° C., agitated at the temperature for 3 hours, and cooled, obtaining a silicone rubber base. In a planetary mixer, 50 parts of the silicone rubber base, 50 parts of a dimethylpolysiloxane (2) blocked with a dimethylvinylsiloxy group at each end of its molecular chain and having a viscosity of 1,000 centipoise at 25° C., 2 parts of a thermoplastic resin hollow filler (microspheres) having a specific gravity of 0.04 and a mean particle size of 40 µm (Expancel 551DE by Expancel) and 10 parts of glycerin were agitated for 30 minutes. Then 3.5 parts of a methylhydrogenpolysiloxane (3) having Si—H groups at both ends and side chains (having a degree of polymerization of 17 and a Si—H content of 0.0060 mol/g) as a crosslinking agent, and 0.05 part of ethynyl cyclohexanol as a reaction regulator were added. Agitation was continued for 15 minutes, yielding a silicone rubber composition. With 0.1 part of a platinum catalyst (Pt concentration 1%) added, the silicone rubber composition was pressed cured at 120° C. for 10 minutes and post cured in an oven at 200° C. for 2 hours. The silicone rubber was measured for specific gravity, hardness and compression set (150° C./22 hours and 180° C./22 hours) according to JIS K-6249. The results are shown in Table 1.

Example 2

In a mixer, 65 parts of the dimethylpolysiloxane (1) used in Example 1, 35 parts of fumed silica having a specific surface area of 300 m²/g (Aerosil 300 by Nippon Aerosil K.K.), 6 parts of hexamethyldisilazane, 0.5 part of divinyltetramethyldisilazane, and 2.0 parts of water were mixed for 30 minutes at room temperature, heated at 150° C., agitated at the temperature for 3 hours, and cooled, obtaining a silicone rubber base. In a planetary mixer, 50 parts of the silicone rubber base, 50 parts of a dimethylpolysiloxane (4) blocked with a dimethylvinylsiloxy group at each end of its molecular chain and having a viscosity of 100,000 centipoise at 25° C., 1.2 parts of a thermoplastic resin hollow filler having a specific gravity of 0.02 and a mean particle size of 90 µm (Microsphere F-80ED by Matsumoto Yushi K.K.) and 5 parts of ethylene glycol were agitated for 30 minutes. Then 2.0 parts of a methylhydrogenpolysiloxane (3) having Si—H groups at both ends and side chains (having a degree of polymerization of 17 and a Si—H content of 0.0060 mol/g) as a crosslinking agent and 0.05 part of ethynyl cyclohexanol as a reaction regulator were added. Agitation was continued for 15 minutes, yielding a silicone rubber composition. As in Example 1, the silicone rubber composition, with 0.1 part of a platinum catalyst (Pt concentration 1%) added, was cured, and the silicone rubber measured for specific gravity, hardness and compression set (150° C./22 hours and 180° C./22 hours). The results are shown in Table 1.

Example 3

In a mixer, 70 parts of the dimethylpolysiloxane (1) used in Example 1, 30 parts of precipitated silica having a specific surface area of 200 m²/g (Nipsil LP by Nippon Silica Industry K.K.), 3 parts of hexamethyldisilazane, 0.5 part of divinyltetramethyldisilazane, and 1.0 part of water were mixed for 30 minutes at room temperature, heated at 150° C., agitated at the temperature for 3 hours, and cooled, obtaining a silicone rubber base. In a planetary mixer, 70 parts of the silicone rubber base, 30 parts of the dimethylpolysiloxane (2) used in Example 1, 3.0 parts of the thermoplastic resin hollow filler (Microsphere F-80ED by Matsumoto Yushi K.K.) used in Example 2, and 10 parts of triethylene glycol were agitated for 30 minutes. Then 3.2 parts of a methylhydrogenpolysiloxane (3) having Si—H groups at both ends and side chains (having a degree of polymerization of 17 and a Si—H content of 0.0060 mol/g) as a crosslinking agent and 0.05 part of ethynyl cyclohexanol as a reaction regulator were added. Agitation was continued for 15 minutes, yielding a silicone rubber composition. As in Example 1, the silicone rubber composition, with 0.1 part of a platinum catalyst (Pt concentration 1%) added, was cured, and the silicone rubber measured for specific gravity, hardness and compression set (150° C./22 hours and 180° C./22 hours). The results are shown in Table 1.

Example 4

In a planetary mixer, 92 parts of a dimethylpolysiloxane (5) blocked with a trivinylsiloxy group at each end of its molecular chain and having a viscosity of 10,000 centipoise at 25° C., 8 parts of hydrophobicized fumed silica having a specific surface area of 110 m²/g (Aerosil R-972 by Nippon Aerosil K.K.), 2.5 parts of a thermoplastic resin hollow filler having a specific gravity of 0.018 and a mean particle size of 100 µm (Microsphere F-100ED by Matsumoto Yushi K.K.), and 8 parts of glycerin diacetate were agitated for 30 minutes. Then 0.8 part of t-butyl peroxyisopropyl monocarbonate (Perbutyl I by NOF K.K.) as a crosslinking agent was added to the mixture, which was mixed for 15 minutes, yielding a silicone rubber composition. The silicone rubber composition was pressed cured at 140° C. for 10 minutes and post cured in an oven at 200° C. for 2 hours. The silicone rubber was measured for specific gravity, hardness and compression set (150° C./22 hours and 180° C./22 hours) according to JIS K-6249. The results are shown in Table 1.

Example 5

A rubber compound was prepared by mixing 100 parts of a gum-like diorganopolysiloxane consisting of 99.825 molt of dimethylsiloxane units, 0.15 mol % of methylvinylsiloxane units and 0.025 mol % of dimethylvinylsiloxy units and having an average degree of polymerization of about 8,000, 5 parts of a silanol end-blocked dimethylpolysiloxane having an average degree of polymerization of 10 as a dispersant, and 25 parts of fumed silica having a specific surface area of 200 m²/g (Nippon Aerosil K.K.). Using a two-roll mill, 2.0 parts of the thermoplastic resin hollow filler (Microsphere F-80ED by Matsumoto Yushi K.K.) used in Example 2 and 5 parts of glycerin were uniformly dispersed in 100 parts of the rubber compound, and 0.5 part of 2,5-dimethyl-bis(2,5-t-butylperoxy)hexane uniformly dispersed therein. The resulting silicone rubber composition was pressed cured at 170° C. for 10 minutes and post cured in an oven at 200° C. for 2 hours. The silicone rubber was measured for specific gravity, hardness and compression set (150° C./22 hours and 180° C./22 hours) according to JIS K-6249. The results are shown in Table 1.

Example 6

In a mixer, 70 parts of the dimethylpolysiloxane (1) used in Example 1, 30 parts of precipitated silica having a specific surface area of 200 m²/g (Nipsil LP by Nippon Silica Industry K.K.), 3 parts of hexamethyldisilazane, 0.5 part of divinyltetramethyldisilazane, and 1.0 part of water were mixed for 30 minutes at room temperature, heated at 150° C., agitated at the temperature for 3 hours, and cooled, obtaining a silicone rubber base. In a planetary mixer, 70 parts of the silicone rubber base, 30 parts of the dimethylpolysiloxane (2) used in Example 1, 4 parts of an unexpanded filler encapsulating isobutane and having an expansion temperature of 90 to 120° C. (642WU by Expancel), 5 parts of diethylene glycol monomethyl ether, and 3 parts of ethylene glycol were agitated for 30 minutes. Then 3.2 parts of a methylhydrogenpolysiloxane (3) having Si—H groups at both ends and side chains (having a degree of polymerization of 17 and a Si—H content of 0.0060 mol/g) as a crosslinking agent and 0.05 part of ethynyl cyclohexanol as a reaction regulator were added. Agitation was continued for 15 minutes, yielding a silicone rubber composition. After 0.1 part of a platinum catalyst (Pt concentration 1%) was admixed, the silicone rubber composition was cured and expanded in an oven at 150° C. for 30 minutes. The silicone rubber was measured for specific gravity, hardness and compression set (150° C./22 hours and 180° C./22 hours) as in Example 1. The results are shown in Table 1.

Comparative Example 1

A silicone rubber composition was prepared as in Example 1 without adding glycerin, cured and tested. The results are shown in Table 1.

Comparative Example 2

A silicone rubber composition was prepared as in Example 2 without adding ethylene glycol, cured and tested. The results are shown in Table 1.

Comparative Example 3

A silicone rubber composition was prepared as in Example 3 without adding triethylene glycol, cured and tested. The results are shown in Table 1.

Comparative Example 4

A silicone rubber composition was prepared as in Example 4 without adding glycerin diacetate, cured and tested. The results are shown in Table 1.

Comparative Example 5

A silicone rubber composition was prepared as in Example 5 without adding glycerin, cured and tested. The results are shown in Table 1.

Comparative Example 6

A silicone rubber composition was prepared as in Example 6 without adding diethylene glycol monomethyl ether and ethylene glycol, cured and tested. The results are shown in Table 1.

Comparative Example 7

A silicone rubber composition was prepared as in Example 1 except that 10 parts of polyethylene glycol (having a weight average degree of polymerization of 20 as measured by liquid chromatography) was added instead of 10 parts of glycerin. It was similarly cured and tested. The results are shown in Table 1.

TABLE 1

|  | E1 | E2 | E2 | E4 | E5 | E6 | CE1 | CE2 | CE3 | CE4 | E5 | E6 | E7 |
|---|---|---|---|---|---|---|---|---|---|---|---|---|---|
| Specific gravity | 0.79 | 0.82 | 0.65 | 0.66 | 0.72 | 0.64 | 0.78 | 0.80 | 0.61 | 0.64 | 0.68 | 0.62 | 0.78 |
| Hardness (Durometer A) | 28 | 24 | 27 | 35 | 36 | 33 | 31 | 25 | 31 | 38 | 40 | 35 | 24 |
| Compression set (150° C./22 hr) | 16 | 21 | 29 | 26 | 30 | 35 | 86 | 85 | 95 | 89 | 79 | 88 | 51 |
| Compression set (180° C./22 hr) | 38 | 36 | 48 | 32 | 51 | 62 | 100 | 99 | 100 | 98 | 96 | 100 | 82 |

The silicone rubber compositions of the invention cure into low specific gravity silicone rubber elastomers which undergo a minimal compression set even at elevated temperature.

Japanese Patent Application No. 2000-030347 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition comprising
   (A) 100 parts by weight of a heat curable organopolysiloxane composition,
   (B) 0.1 to 30 parts by weight of a thermally expandable, unexpanded organic resin fine filler or expanded organic resin fine hollow filler, and
   (C) 0.5 to 50 parts by weight of at least one of polyhydric alcohols and derivatives thereof, wherein the polyhydric alcohol is a monomer having at least two alcoholic hydroxyl groups in a molecule or an oligomer thereof having a degree of polymerization of 2 to 10, and the polyhydric alcohol derivative is a monomer having at least one residual alcoholic hydroxyl group in a molecule or an oligomer thereof having a degree of polymerization of 2 to 10.

2. The composition of claim 1 wherein in component (B), the expanded organic resin fine hollow filler has a specific gravity of 0.01 to 0.5 and a mean particle size of 10 to 200 µm.

3. The composition of claim 1 wherein in component (B), the unexpanded organic resin fine filler comprises an organic resin shell encapsulating a volatile material or low-boiling material so that when heat expanded, it forms a hollow filler having a mean particle size of 10 to 200 µm.

4. The composition of claim 1 wherein in component (B), the organic resin of the filler is a polymer of a monomer or a copolymer of at least two monomers selected from the group consisting of vinylidene chloride, acrylonitrile, methacrylonitrile, acrylates, and mechacrylates.

5. The composition of claim 1 wherein the heat curable organopolysiloxane composition (A) is an addition reaction curing type organopolysiloxane composition or an organic peroxide curing type organopolysiloxane composition.

6. The composition of claim 5 wherein the addition reaction curing type organopolysiloxane composition comprises (1) 100 parts by weight of an organopolysiloxane having on the average at least two alkenyl groups in a molecule, (2) 0.1 to 50 parts by weight of an organohydrogenpolysiloxane having on the average at least two hydrogen atoms attached to silicon atoms in a molecule, and (3) a catalytic amount of an addition reaction catalyst.

7. The composition of claim 5 wherein the organic peroxide curing type organopolysiloxane composition comprises (i) 100 parts by weight of an organopolysiloxane having on the average at least two alkenyl groups in a molecule, and (ii) a catalytic amount of an organic peroxide.

8. The composition of claim 2 wherein in component (B), the expanded organic resin fine hollow filler has a specific gravity of 0.01 to 0.3 and a mean particle size of 10 to 150 µm.

9. The composition of claim 1 comprising 0.2 to 20 parts by weight of component (B) per 100 parts by weight or component (A).

10. The composition of claim 1 wherein component (B) comprises 10 to 80% by volume thereof.

11. The composition of claim 1 wherein component (C) is a member selected from the group consisting of glycerin, ethylene glycol, propylene glycol, pentaerythritol, glycerin-α-monochlorohydrin, diethylene glycol, triethylene glycol, dipropylene glycol, polyethylene glycol, polypropylene glycol, polyglycerin, ethylene glycol monoethyl ether, ethylene glycol monophenyl ether, diethylene glycol monomethyl ether, dipropylene glycol monoethyl ether, glycerin monoacetate, glycerin diacetate, ethylene glycol monoacetate, and mixtures thereof.

12. The composition of claim 11 wherein component (C) is a member selected from the group consisting of glycerin, ethylene glycol, triethylene glycol, glycerin diacetate, and a mixture of glycerin and diethylene glycol monomethyl ether.

* * * * *